(12) United States Patent
Buch et al.

(10) Patent No.: US 9,708,127 B2
(45) Date of Patent: Jul. 18, 2017

(54) CONVEYOR BELT AND CONVEYING DEVICE EQUIPPED WITH SAID CONVEYOR BELT

(71) Applicant: Forbo Siegling GmbH, Hannover (DE)

(72) Inventors: Torsten Buch, Wedemark (DE); Benjamin Kabore, Oldenburg (DE); Claudius Hayduk, Hannover (DE)

(73) Assignee: FORBO SIEGLING GMBH, Hannover (DE)

( * ) Notice: Subject to any disclaimer, the term of this patent is extended or adjusted under 35 U.S.C. 154(b) by 0 days.

(21) Appl. No.: 15/111,820

(22) PCT Filed: Dec. 19, 2014

(86) PCT No.: PCT/DE2014/100459
§ 371 (c)(1),
(2) Date: Jul. 15, 2016

(87) PCT Pub. No.: WO2015/106735
PCT Pub. Date: Jul. 23, 2015

(65) Prior Publication Data
US 2016/0325936 A1 Nov. 10, 2016

(30) Foreign Application Priority Data
Jan. 16, 2014 (DE) .......... 10 2014 100 475

(51) Int. Cl.
*B65G 15/34* (2006.01)
*B65G 15/36* (2006.01)
*B65G 15/62* (2006.01)

(52) U.S. Cl.
CPC .......... *B65G 15/36* (2013.01); *B65G 15/34* (2013.01); *B65G 15/62* (2013.01)

(58) Field of Classification Search
CPC .................. B65G 15/34; B65G 15/36
USPC .................................. 198/846, 847
See application file for complete search history.

(56) References Cited

U.S. PATENT DOCUMENTS

| 2,575,813 | A | 11/1951 | Hutching |
| 5,595,284 | A | 1/1997 | Takahashi et al. |
| 2004/0132587 | A1 | 7/2004 | Leighton et al. |
| 2006/0115755 | A1* | 6/2006 | Bender .............. G03G 5/14704 430/56 |
| 2009/0233746 | A1 | 9/2009 | Leighton et al. |
| 2010/0035731 | A1 | 2/2010 | Rohr et al. |

(Continued)

FOREIGN PATENT DOCUMENTS

| CA | 2856274 A1 | 5/2013 |
| DE | 19610603 A1 | 11/1996 |

(Continued)

*Primary Examiner* — James R Bidwell
(74) *Attorney, Agent, or Firm* — Leydig, Viot & Mayer, Ltd.

(57) ABSTRACT

A continuous transporting belt has a multilayered structure. The multilayered structure includes at least a first layer that forms a running side, and at least a second layer that forms a load-bearing side. At least one of the layers is connected by an adhesion layer to at least one third layer that forms at least one of a tension member and a further layer. The adhesion layer contains a composition having a first portion of an adhesive and a second portion of a lubricant.

10 Claims, 2 Drawing Sheets

(56) References Cited

U.S. PATENT DOCUMENTS

| | | | |
|---|---|---|---|
| 2011/0282313 A1* | 11/2011 | Lu | A61F 13/5148 604/378 |
| 2012/0313200 A1* | 12/2012 | Jackrel | H01L 31/0322 257/431 |
| 2014/0287862 A1 | 9/2014 | Yamada et al. | |

FOREIGN PATENT DOCUMENTS

| | | |
|---|---|---|
| DE | 102004002738 A1 | 8/2005 |
| DE | 102005041523 A1 | 3/2007 |
| EP | 1281639 B1 | 2/2003 |
| EP | 2259989 B1 | 12/2010 |
| EP | 2423255 A1 | 2/2012 |
| WO | WO 2008113195 A1 | 9/2008 |
| WO | WO 2012161141 A1 | 11/2012 |

\* cited by examiner

CONVEYOR BELT AND CONVEYING DEVICE EQUIPPED WITH SAID CONVEYOR BELT

CROSS-REFERENCE TO PRIOR APPLICATIONS

This application is a U.S. National Stage Application under 35 U.S.C. §371 of International Application No. PCT/DE2014/100459 filed on Dec. 19, 2014, and claims benefit to German Patent Application No. DE 10 2014 100 475.2 filed on Jan. 16, 2014. The International Application was published in German on Jul. 23, 2015 as WO 2015/106735 A1 under PCT Article 21(2).

FIELD

The invention relates to a continuous transporting belt having a multilayered structure, with at least a layer of a fabric that forms a load-bearing side, and with a layer that forms a running side, which are inseparably connected to one another by means of an adhesion layer with a layer that forms a tension member arranged between the load-bearing side and the running side. The invention also relates to a transporting device equipped with said transporting belt, with a sliding arrangement of the transporting belt on a sliding table of the transporting device.

Such a transporting belt may consist in practice of a tension member which is enclosed on one side by a layer or coating that forms the load-bearing side and on the other side by a layer or coating that forms the running side.

BACKGROUND

Belt conveyors that comprise a transporting belt with an upper advancing portion (upper strand) and a lower returning portion (lower strand) are generally known. For this purpose, the belt conveyors usually have a sliding table, which forms a support and on which the load-bearing strand slides. Such conveying devices are used for transporting items and/or people, for example in automobile construction as a "worker-rider belt" running parallel to the actual assembly line.

It is known to mount a sliding table, on which the upper strand runs, with a lower sliding surface on the lower strand in a floating manner. The lower strand is in turn mounted in a sliding manner with respect to the base, specifically by means of a fixed sliding table. In the case of this prior art, the force of the weight of the load is therefore directed over the surface area by the returning lower strand.

DE 10 2005 041 523 A1 proposes as a development of this prior art additionally providing a co-running auxiliary belt between the lower strand and the base.

DE 10 2004 002 738 A1 discloses a belt conveyor of which the upper strand is mounted by means of a sliding table, which is supported on a supporting frame that rests for example on the ground. The (unloaded) lower strand is mounted in a rolling manner by supporting rollers.

In this case, the load-bearing side is optimized with regard to whatever is being transported and also the desired chemical, physiological and mechanical properties of the belt by various coating materials, thicknesses and structures.

The suitability for use is greatly influenced by the tension member and the fabric used for it, for example a polyester fabric. In particular, they determine the belt running properties, the stress/strain characteristics, the electrostatic properties, the flatness and the knife-edge and curve inclination.

The running side and its properties essentially determine the noise emission, the energy consumption and also the wear and the usability for the sliding support of the transporting belt.

The load-bearing side and the running side may be realized for example by coatings of plastic or elastomer, innumerable variants being feasible for different types of transporting belt and configurations and the various practical requirements.

In practice, measures for realizing optimum friction pairings, and thus allowing energy-saving and environmentally friendly operation, have already been successfully developed. As a result, the operating costs are reduced by the lower friction coefficient, so that at the same time the drive power that is required during operation can also be reduced. Furthermore, reduced noise emissions, and consequently improved working conditions, are thereby obtained during operation. In addition, long service lives are achieved.

Providing the running-side fabric with a sliding layer that acts permanently as a dry lubricant has the effect of minimizing the energy demand.

The low friction coefficient with respect to the table has the effect of lowering the drive power that has to be effectively transferred.

A transporting belt with the aim of reducing friction is for example also known from EP 2 259 989 B1. The transporting belt has a first fabric layer and a second fabric layer of a polyester fabric, which between them enclose a composition that contains polyurethane, polyvinylchloride and a flame retardant.

Furthermore, EP 1 281 639 B1 discloses a perforated belt, preferably of metal, with an applied nonstick coating, which comprises PTFE (polytetrafluoroethylene), silicone or nanoparticles.

SUMMARY

In an embodiment, the present invention provides a continuous transporting belt having a multilayered structure. The multilayered structure includes at least a first layer that forms a running side, and at least a second layer that forms a load-bearing side. At least one of the layers is connected by an adhesion layer to at least one third layer that forms at least one of a tension member and a further layer. The adhesion layer contains a composition having a first portion of an adhesive and a second portion of a lubricant.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
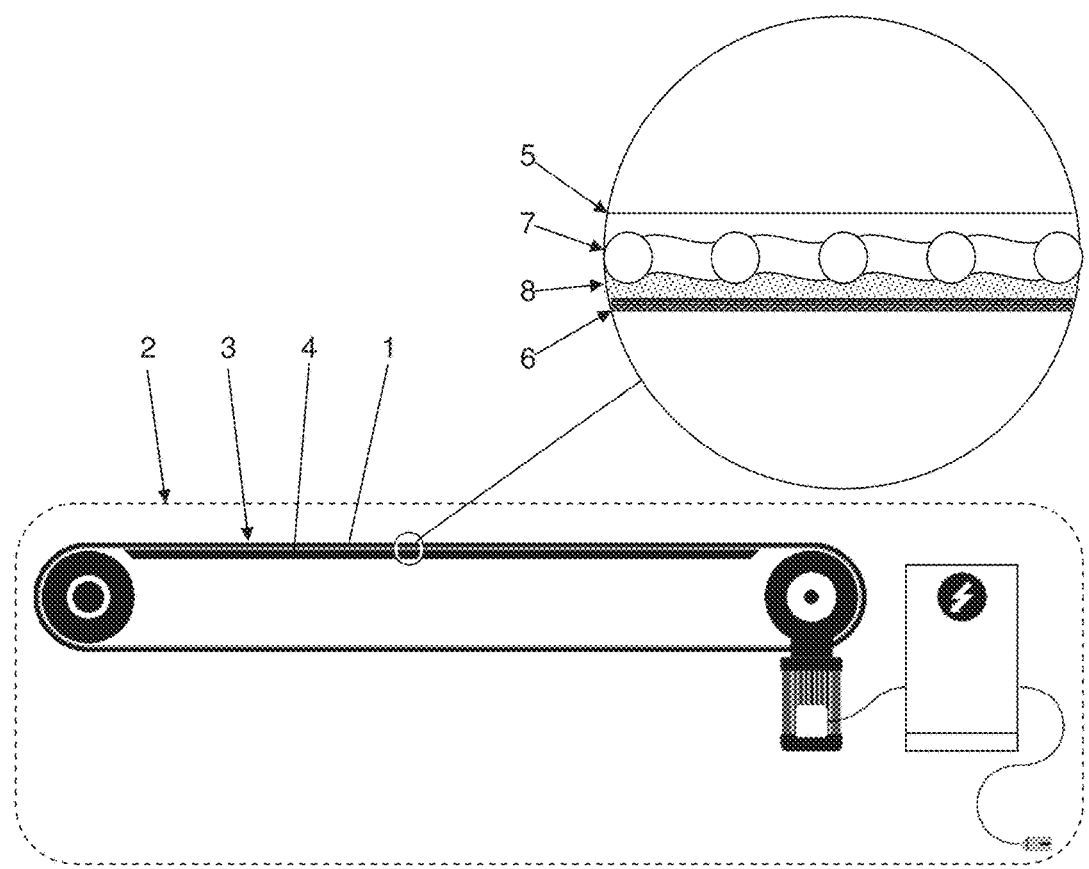
FIG. 1 shows a transporting device equipped with a transporting belt in a basic representation.

The inventors have recognized, that, in practice, the application of the friction-reducing layer involves an additional working step, and consequently additional effort. It has also been found that, although a comparatively great layer thickness of the friction-reducing layer reliably reduces the friction, the layer is for its part subjected to increased abrasion, and consequently wear.

In an embodiment, the invention provides a possible way of reducing the effort involved in the production of a friction-optimized transporting belt. In another embodiment, the invention provides a transporting device equipped with such a belt, in which the friction resistance occurring during operation between the sliding table and the running side of the transporting belt is reduced.

In an embodiment, the invention therefore provides a transporting belt in which the adhesion layer between the layer that forms the running side and the tension member contains a composition with a first portion of an adhesive and with a second portion of a lubricant. The invention is in this embodiment based on the surprising finding that the lubricant does not reduce the adhesive properties between the two layers connected by it, at least not to any appreciable extent.

At the same time, however, a transference of the second portion of the lubricant, in particular by diffusion or migration, the mechanisms of which are not yet fully understood, advantageously has the effect that a portion of the lubricant collects on the outer side of the running side that is facing away from the tension member and, as a result, the desired friction-reducing properties are realized there.

This accumulation of the lubricant may for example take place over the surface area on the running side and form a further layer there. The fact that the friction-reducing properties can be produced without an additional working step means that the effort involved in production is reduced and the costs are lowered. In addition, it has been found that, when it is abrasively removed from the running side during operation, the lubricant moves out of the intermediate region between the layers, and consequently a sufficient amount of the lubricant is available on the running side over a very long period of time.

The invention is in this embodiment based on the surprising finding for a person skilled in the art that the cohesive strength between the layer that forms the running side and the tension member is not reduced as a result of the composition introduced between them, although the preconception of those skilled in the art is that the lubricant would have to impair the formation of the connection.

According to the current understanding, it must be assumed that, on the basis of there being a homogeneous distribution, the concentration of lubricant does not impair the connection. Under the action of the diffusion effects occurring, the free portions of the lubricant in the composition move around and thus penetrate to the surface, that is to say the outer face of the running side, collect there and lead to an increase in the local concentration.

In other words, the initially homogeneous distribution in the composition at first has the effect that the portion of the lubricant in the region between the tension member and the running side does not impair, or significantly impair, the adhesive properties of the composition, based on the portion of the adhesive. On the basis of the physical reaction that primarily acts here, the resultant adhesive connection is independent of later changes in the local concentration in the composition.

The adhesive connection acting as a barrier is conducive to the later-occurring transference to the free surface facing away from it, through the layer on the running side to the outer side of the running side, where there is as a consequence a local increase in the concentration in favor of the lubricant portion.

It has in this case already proven to be particularly advantageous if the composition comprises polyvinyl chloride (PVC) powder, plasticizers, stabilizers, adhesion promoters or a polyurethane (PU) adhesive. Suitable for this for example is isocyanate, if appropriate in combination with a colorant. The isocyanates crosslink and react with the polyester fabric of the layer of the tension member.

A physical connection with the tension member is created in the adhesion layer, while a chemical reaction with respect to the outer layer leads to the connection. In this case, a reaction between the isocyanate and the lubricant, for example silicone, does not take place. After their reaction, the two connections are not changed by later diffusion of the lubricant portions; even so, the physical bonding can form a barrier layer that is impermeable for the lubricant portion, while the chemical bonding is permeable, at least to a restricted extent, for the lubricant portions.

With particular preference, the lubricant contains natural or synthetic waxes, silicones, polysiloxane and/or polydimethyl siloxane.

In another embodiment, the invention provides a transporting device equipped with the transporting belt, with a sliding table that serves for supporting the transporting belt and with a contact face for the running side of the transporting belt.

FIG. 1 shows in a basic representation a transporting device 2 that is equipped with a transporting belt 1 and has a sliding arrangement. For this purpose, an upper strand 3 is supported on a sliding table 4. The continuous transporting belt 1, serving as a conveyor belt, has a multilayered structure, with at least a layer 5 of a fabric that forms a load-bearing side and with a layer 6 that forms a running side and takes the form in particular of a coating, which are inseparably connected to one another during use by means of an adhesion layer 8 with a layer 7 that forms a tension member. The adhesion layer 8 between the layer 6 that forms the running side and the tension member has a composition with a first portion of an adhesive and with a second portion of a lubricant. The invention is based here on the surprising finding for a person skilled in the art that the cohesive strength between the layer 6 that forms the running side and the layer 7 that forms the tension member is not reduced as a result of the composition introduced between them. Rather, on account of the initially homogeneous mixture in the composition, there forms an unreleasable connection of the running side to the layer 7 that is unchanged in comparison with the adhesive connections known from the prior art. The contact face thus produced forms a barrier area for the then occurring transference of the second portion of the composition, which as a result of the one-sided barrier layer primarily moves in the opposite direction and leads there to a local increase in the concentration of the lubricant. In addition to this, the lubricant portion penetrates through the running side and is increasingly deposited on the outer side of the layer 6. This gives rise to the desired effect of lubricant being supplied on the area of the running side that is facing the sliding table 4 solely on the basis of atomic transferences, while abrasion of the lubricant also provides an automatic compensating effect.

Figure 2:
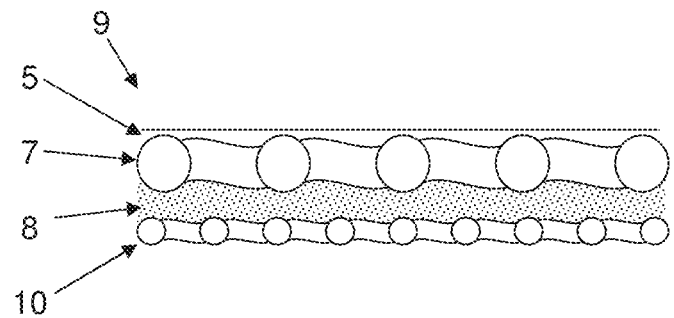
FIG. 2 shows a variant of a transporting belt with a running side formed by a fabric.

In FIG. 2 there is also shown a variant of a transporting belt 9 with a layer 10 that is formed by a fabric and serves as a running side, which is connected by means of the adhesion layer 8 to the layer 7 that forms the tension member. The transporting belt 9 otherwise has a structure that coincides substantially with the transporting belt 1 shown in FIG. 1, with a layer 5 of a fabric that forms a load-bearing side.

Figure 3:
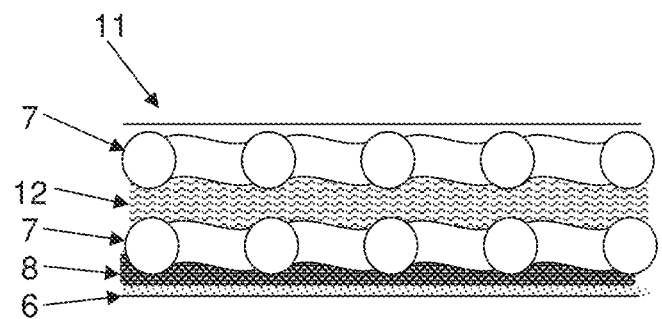
FIG. 3 shows a further variant of a transporting belt with two tension members.

On the other hand, a variant of a further transporting belt 11 that is shown in FIG. 3 differs from the transporting belt 1 that is shown in FIG. 1 by two identical layers 7 that are arranged in parallel and respectively form a tension member, which are permanently connected by a contact layer 12. The lower of the two layers 7 is connected by means of the adhesion layer 8 to the layer 6 that forms the running side. Consequently, the permissible tensile force can be increased in an easy way.

Figure 4:
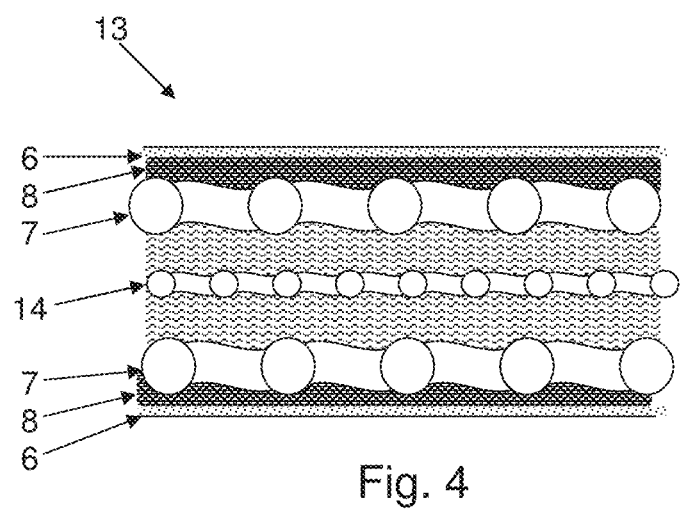
FIG. 4 shows a further variant of a transporting belt with two tension members, enclosing an intermediate layer, and two friction-optimized outer layers.

Furthermore, FIG. 4 also shows a further variant of a transporting belt 13 with two layers 7 of a fabric that respectively form a tension member and enclose an intermediate layer 14 and two friction-optimized layers 6 that respectively form an outer side. The layers 6 that are respectively connected to the assigned layer 7 by means of the adhesion layer 8 can therefore be used according to choice as the load-bearing side or the running side.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A continuous transporting belt comprising, in a multilayered structure,
   a first layer that forms a running side;
   a second layer that forms a load-bearing side;
   a tension member layer disposed between the first and second members; and
   an adhesion layer disposed between the tension member layer and the first layer wherein the adhesion layer contains a composition having an adhesive portion and a lubricant portion,
   wherein the transporting belt is configured to be supported by a sliding table and the running side of the first layer is configured to contact an upper face of the sliding table, and
   wherein the first layer is configured to permit at least some of the lubricant portion to penetrate through the first layer and collect on the running side of the first layer.

2. The transporting belt as claimed in claim 1, wherein the composition comprises a polyvinyl chloride (PVC) powder.

3. The transporting belt as claimed in claim 1, wherein the composition comprises stabilizers.

4. The transporting belt as claimed in claim 1, wherein the composition comprises an adhesion promoter.

5. The transporting belt as claimed in claim 1, wherein the composition comprises a polyurethane (PU) adhesive.

6. The transporting belt as claimed in claim 1, wherein the composition comprises at least one of natural or synthetic waxes, silicones, starch, oil, polysiloxane and polydimethyl siloxane.

7. The transporting belt as claimed in claim 1, wherein the third layer that forms the tension member comprises at least one layer of a textile fabric, textile filaments, wires of plastic, a nonwoven or a film of plastic.

8. The transporting belt as claimed in claim 1, wherein the second layer has a portion of a lubricant.

9. The transporting belt as claimed in claim 1, wherein the first layer substantially consists of at least one of a woven or knitted fabric, a film and a coating.

10. A transporting device, comprising:
    a continuous transporting belt having a multilayered structure, the multilayered structure including at least a first layer that forms a running side, and at least a second layer that forms a load-bearing side, the first layer being connected by an adhesion layer a third layer that forms a tension member, wherein the adhesion layer contains a composition having a first portion of an adhesive and a second portion of a lubricant, and wherein the first layer is configured to permit at least some of the lubricant portion to penetrate through the first layer and to collect on the running side of the first layer; and
    a sliding table configured to support the transporting belt and having a contact face for the first layer of the transporting belt that forms the running side.

\* \* \* \* \*